US010417129B2

(12) United States Patent
Kapoor

(10) Patent No.: US 10,417,129 B2
(45) Date of Patent: Sep. 17, 2019

(54) TRANSACTIONAL MEMORY OPERATION SUCCESS RATE

(71) Applicant: International Business Machines Corporation, Armonk, NY (US)

(72) Inventor: Shakti Kapoor, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 15/589,335

(22) Filed: May 8, 2017

(65) Prior Publication Data

US 2018/0322059 A1    Nov. 8, 2018

(51) Int. Cl.
*G06F 12/0862*    (2016.01)
*G06F 9/52*    (2006.01)

(52) U.S. Cl.
CPC .......... *G06F 12/0862* (2013.01); *G06F 9/528* (2013.01); *G06F 2212/1008* (2013.01); *G06F 2212/507* (2013.01); *G06F 2212/602* (2013.01)

(58) Field of Classification Search
CPC .......... G06F 12/0862; G06F 2212/602; G06F 2212/1008; G06F 2212/507
See application file for complete search history.

(56) References Cited

U.S. PATENT DOCUMENTS

| | | | |
|---|---|---|---|
| 9,262,206 B2 | 2/2016 | Cain, III et al. | |
| 9,400,657 B2 | 7/2016 | Busaba et al. | |
| 2010/0169623 A1* | 7/2010 | Dice | G06F 9/3842 712/229 |
| 2015/0378922 A1 | 12/2015 | Greiner et al. | |
| 2017/0004085 A1* | 1/2017 | Guthrie | G06F 12/0857 |

OTHER PUBLICATIONS

Kapoor et al., "Improving Transactional Memory Operation Success Rate," U.S. Appl. No. 15/813,328, filed Nov. 15, 2017.
List of IBM Patents or Patent Applications Treated As Related; Date Filed: Nov. 15, 2017, 2 pages.

(Continued)

*Primary Examiner* — Tasnima Matin
(74) *Attorney, Agent, or Firm* — Cantor Colburn LLP; Bryan Bortnick

(57) ABSTRACT

Embodiments of the invention are directed to methods for handling cache prefetch requests. The method includes receiving a request to prefetch data from main memory to a cache. The method further includes based on a determination that the prefetch request is a speculative prefetch request, determining if the cache is being used for transactional memory. The method further includes based on a determination that the cache is not being used for transactional memory, processing the prefetch request. The method further includes based on a determination that the cache is being used for transactional memory, and a determination if the prefetch request can be processed without affecting transactional memory, processing the prefetch request. The method further includes based on a determination that the cache is being used for transactional memory, and a determination if the prefetch request can be processed without affecting transactional memory, rejecting the prefetch request.

9 Claims, 6 Drawing Sheets

(56) References Cited

OTHER PUBLICATIONS

Disclosed Anonymously, "Code transformations to expose transactional memory opportunities to an optimizing compiler", Electronic Publication Date: Jun. 20, 2013, 12 Pages, IP.com. No. IPCOM000228582D.

Disclosed Anonymously, "Mechanism to Support Speculation Decisions in a Computer System with Hardware Transactional Memory", Electronic Publication Date: Feb. 25, 2013, 4 Pages, IP.com. No. IPCOM000225652D.

Disclosed Anonymously, "Real-time Transactional Memory for Cyclic Systems", Electronic Publication Date: Feb. 24, 2015, 6 Pages, IP.com. No. IPCOM000240738D.

Negi, et al., "Eager meets Lazy: the Impact of Write-Buffering on Hardware Transactional Memory", 2011 International Conference on Parallel Processing, Date of Conference: Sep. 13-16, 2011, pp. 73-82, Conference Location: Taipei City, Taiwan, IEEE Computer Society. DOI: 10.1109/ICPP.2011.63.

\* cited by examiner

TRANSACTIONAL MEMORY OPERATION SUCCESS RATE

BACKGROUND

The present invention relates in general to the field of computing. More specifically, the present invention relates to systems and methodologies for improving the success rate of transactional memory operations.

Computer systems that allow multiple concurrently executing threads sometimes allow access to shared memory location. Writing multi-threaded programs can be difficult due to the complexities of coordinating concurrent memory access. One approach to controlling concurrent access is the use of transactional memory. In a transactional memory system, a section of code can be designated to be a transaction. The transaction executes atomically with respect to other threads of execution within the transactional memory system. For example, if the transaction includes two memory write operations, then the transactional memory system ensures that all other threads may only observe the cumulative effects of both memory operations or of neither, but not the effects of only one memory operation.

Current implementations of transactional memory limit the number of cache lines (transaction footprint) in a transaction for several different reasons. A transaction is aborted if the core sends out additional cache line requests that are not related to the transactions that will force the eviction of transaction cache lines from the caches, thus impacting the performance of the transaction.

SUMMARY

Embodiments of the present invention are directed to a method for handling cache prefetch requests. The method includes receiving a request to prefetch data from main memory to a cache. The method further includes based on a determination that the prefetch request is a speculative prefetch request, determining if the cache is being used for transactional memory. The method further includes based on a determination that the cache is not being used for transactional memory, processing the prefetch request. The method further includes based on a determination that the cache is being used for transactional memory, and a determination if the prefetch request can be processed without affecting transactional memory, processing the prefetch request. The method further includes based on a determination that the cache is being used for transactional memory, and a determination if the prefetch request can be processed without affecting transactional memory, rejecting the prefetch request.

Embodiments of the present invention are further directed to a computer system handling cache prefetch requests. The computer system includes a cache memory and a processor system communicatively coupled to the cache memory. The processor system is configured to perform a method. The method includes receiving a request to prefetch data from main memory to a cache. The method further includes based on a determination that the prefetch request is a speculative prefetch request, determining if the cache is being used for transactional memory. The method further includes based on a determination that the cache is not being used for transactional memory, processing the prefetch request. The method further includes based on a determination that the cache is being used for transactional memory, and a determination if the prefetch request can be processed without affecting transactional memory, processing the prefetch request. The method further includes based on a determination that the cache is being used for transactional memory, and a determination if the prefetch request can be processed without affecting transactional memory, rejecting the prefetch request.

Embodiments of the present invention are further directed to a design structure embodied in a machine-readable storage medium for designing, manufacturing, or testing an integrated circuit. The design structure comprises includes a cache memory and a processor system communicatively coupled to the cache memory. The processor system is configured to perform a method.

The method includes receiving a request to prefetch data from main memory to a cache. The method further includes based on a determination that the prefetch request is a speculative prefetch request, determining if the cache is being used for transactional memory. The method further includes based on a determination that the cache is not being used for transactional memory, processing the prefetch request. The method further includes based on a determination that the cache is being used for transactional memory, and a determination if the prefetch request can be processed without affecting transactional memory, processing the prefetch request. The method further includes based on a determination that the cache is being used for transactional memory, and a determination if the prefetch request can be processed without affecting transactional memory, rejecting the prefetch request.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
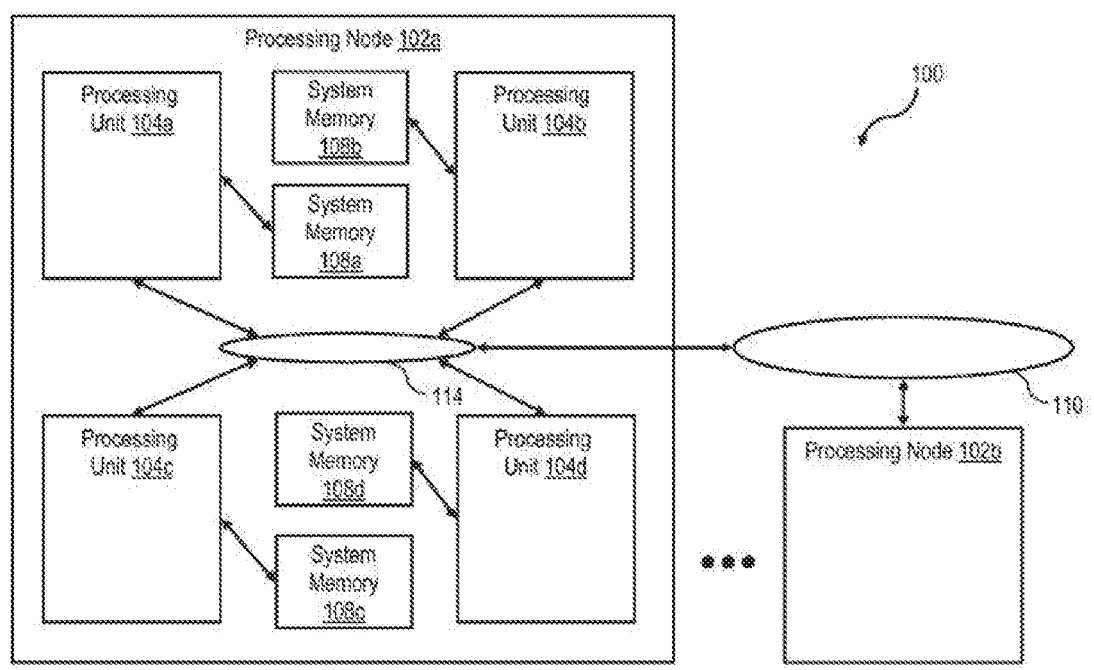
FIG. 1 depicts an overview of a data processing system according to embodiments of the invention.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of managing transactional memory. Additionally, at least the features and combinations of features described in the immediately following paragraphs, including the corresponding features and combinations of features depicted in the figures go beyond what is well understood, routine and conventional in the relevant field(s).

Shared memory occurs in computing systems that have multiple threads and/or multiple cores and/or multiple users. An exemplary issue that can occur with shared memory is when two different processes attempt to read or write the same memory location simultaneously.

Figure 3:
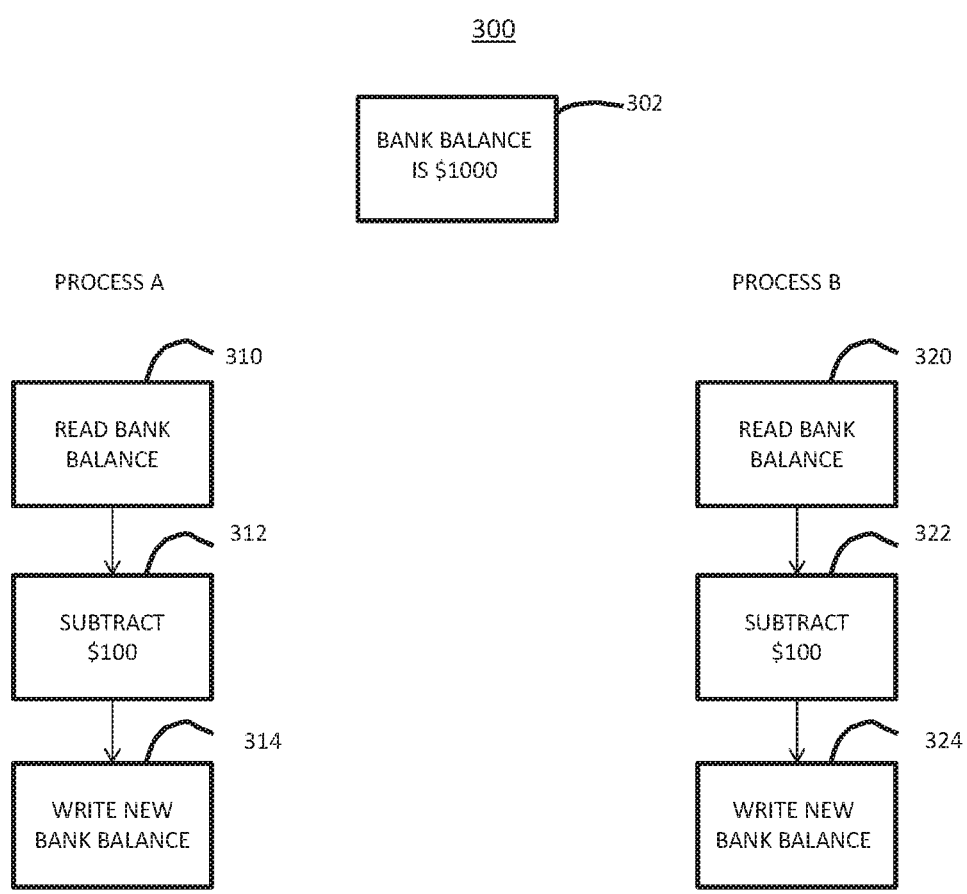
FIG. 3 depicts a flow diagram illustrating a situation that can occur with shared memory.

To provide an exemplary, simplified situation, refer to the flowchart of FIG. 3. imagine a program that updates a bank balance. The bank balance starts at $1,000 (block 302). Process A and Process B simultaneously perform. Process A reads the bank balance (block 310), then updates the bank balance by withdrawing $100 (block 312) and writing the new balance (block 314). Process B reads the bank balance (block 320), then attempts to update the bank balance by depositing $200 (block 322) and writing the new balance (block 324).

If Process A and Process B occur sequentially in either order, the result is a balance of $1,100 ($1,000−$100+$200). However, if block 220 occurs after block 210 but prior to block 210, then Process B reads the balance value before Process A has finished. The result is that both Process A and Process B attempt to write at the same time, then both are adding or subtracting the value from the same balance value. The result is either a failure to write or the wrong value is written into the bank balance feed.

One method of addressing such a situation is the use of a lock. When Process A reads the balance, it locks the memory address of the balance. Therefore, Process B cannot read the balance can obtain incorrect information. Once Process A is finished with its task, it unlocks the memory address, which allows Process B to perform.

While such a process can solve the problem of two processes simultaneously reading or writing the same memory location, other problems can be caused by such a lock procedure. For example, overhead is incurred by the use of the locks, Process B might sit idle while waiting for the release of a lock, and the potential of a deadlock, where two processes are waiting for the other process to release a lock in order to perform a particular function. Because both processes are dependent on each other, the deadlock prevents either process from finishing. While a case of two processes can be relatively simple to avoid a deadlock, a multi-threaded or multi-processor machine can make it more difficult to avoid the deadlock. There are other shortcomings of locking. These shortcomings can include the possibility of a deadlock when a given thread holds more than one lock and prevents the forward progress of other threads. In addition, there is a performance cost to lock acquisition which might not have been necessary because no conflicting accesses would have occurred.

One type of memory system that addresses such problems is transactional memory. Transactional memory simplifies parallel programming by grouping read and write operations and performing them like a single operation. Transactional memory is like database transactions where all shared memory accesses and their effects are either committed all together or discarded together as a group. All threads can enter the critical region simultaneously. If there are conflicts in accessing the shared memory data, threads try accessing the shared memory data again or are stopped without updating the shared memory data. Therefore, transactional memory can be considered lock-free synchronization. A traditional lock scheme would involve a process locking a memory location, performing operations on the locked memory location, and then releasing the lock. In contrast, a transactional scheme involves a process declaring a memory location to be atomic, then performing transactions on a copy of the memory location. Upon completion of the process, the processor (also known as a central processing unit or CPU) determines if there are any conflicts. If there are conflicts, then transaction fails and has to try again. However, if there are no conflicts, then the transaction succeeds and the memory changes are made permanent. An advantage of transactional memory is that if there is no direct conflict between two memory locations, then two processes can operate in parallel, instead of having to wait for a lock to be released. The memory locations involved in the transaction can be called a transaction footprint.

With continued reference to FIG. 3, in a transactional memory system, process A, comprising blocks 310, 312, and 314, is considered one transaction and process B, comprising block 320, 322, and 324, is considered a second transaction. Process A copies the bank balance to a first temporary memory location, then completes blocks 312 and 314. Process B copies the bank balance to a second temporary memory location, then completes blocks 312 and 314. After Process A is complete, it determines if any other action was taken with respect to the bank balance. If not, then the new bank balance is written to the permanent memory location. However, if after Process A completes, it turns out that Process B has not completed, then Process A is aborted and has to start again. In such a manner, there is no overwriting of data by other processes and there is no need to perform a memory lock.

Figure 4:
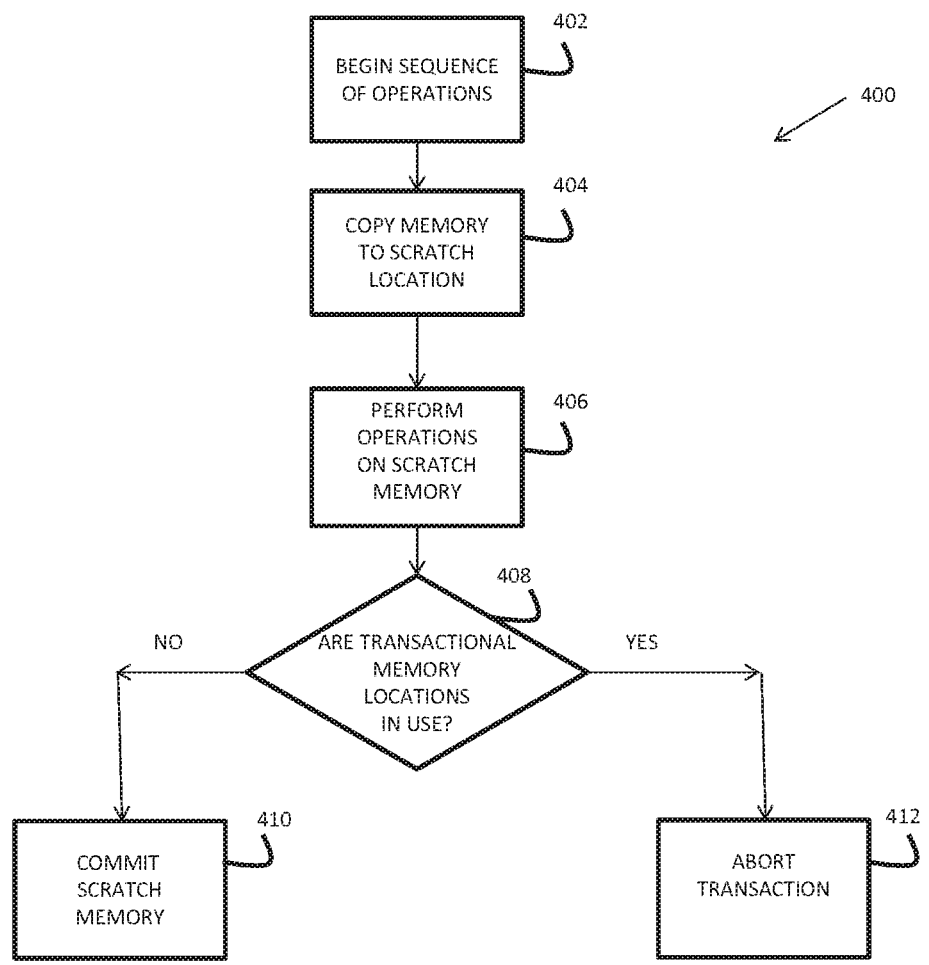
FIG. 4 depicts a flow diagram illustrating the operation of a transactional memory system.

A flowchart illustrating method 400 is presented in FIG. 4. Method 400 is merely exemplary and is not limited to the embodiments presented herein. Method 400 can be employed in many different embodiments or examples not specifically depicted or described herein. In some embodiments, the procedures, processes, and/or activities of method 400 can be performed in the order presented. In other embodiments, one or more of the procedures, processes, and/or activities of method 400 can be combined or skipped. In one or more embodiments, method 400 is performed by a processor as it is executing instructions.

Method 400 is a simplified flowchart illustrating the operation of transactional memory. It should be understood that other implementations of transactional memory are possible. A sequence of operations begins (block 402). A set of memory locations are copied to a "scratch" or temporary memory location (block 404). These are considered the transactional memory locations. Operations are then performed on the scratch memory locations (406). After the transaction block is finished processing, it is determined if the set of transactional memory locations are being operated upon by another sequence (block 408). Such a determination can occur using a form of transactional memory logic. The transactional memory logic includes entries that indicate which areas of memory are being used for transactional memory. If the determination shows that the memory locations are not being used, then the transaction is finalized by committing the scratch memory to the set of memory locations (block 410). Otherwise, the transaction is aborted and started again (block 412).

With reference to both FIG. 3 and FIG. 4, if Process A completes before Process B ever begins, then block 410 will execute. However, if Process B starts after Process A starts, but before it finishes, block 412 will occur for Process A because, from the perspective of Process A, the memory location is in use. However, Process B might finish and commit prior to Process A re-starting.

Thus, it can be seen that there are some advantages to transactional memory. The overhead of obtaining a memory lock was prevented and Process B was not required to remain idle while waiting for a memory lock to be released. While this was a simplified example showing only two processes running on two cores, if you have multiple parallel operations which access a data structure, all of which are capable of writing to it, but few of which actually do, then lock-based memory synchronization may require that all such operations be run serially to avoid the chance of data corruption. Transactional memory can allow almost all the operations to be executed in parallel, only losing parallelism when some process actually does write to the data structure.

A cache is a set of small, fast area of memory that a processor uses to process data more quickly. Because cache memory is faster than system memory, a processor can access cache memory more quickly and thus not be burdened by a slow system memory.

Cache memories are commonly utilized to temporarily buffer memory blocks that might be accessed by a processor in order to speed up processing by reducing access latency introduced by having to load needed data and instructions from slower system memory. In some embodiments, the level one (L1) cache is associated with one particular processor core and cannot be accessed by other cores. Typically, in response to a memory access instruction such as a load or store instruction, the processor core first accesses the directory of the upper-level cache. If the requested memory block is not found in the upper-level cache, the processor core can then access lower-level caches such as level 2 (L2) or level 3 (L3) caches or system memory for the requested memory block. The lowest level cache (L3 in some embodiments, level 4 (L4) or level 5 (L5) in other embodiments) is often shared among several processor cores.

With reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
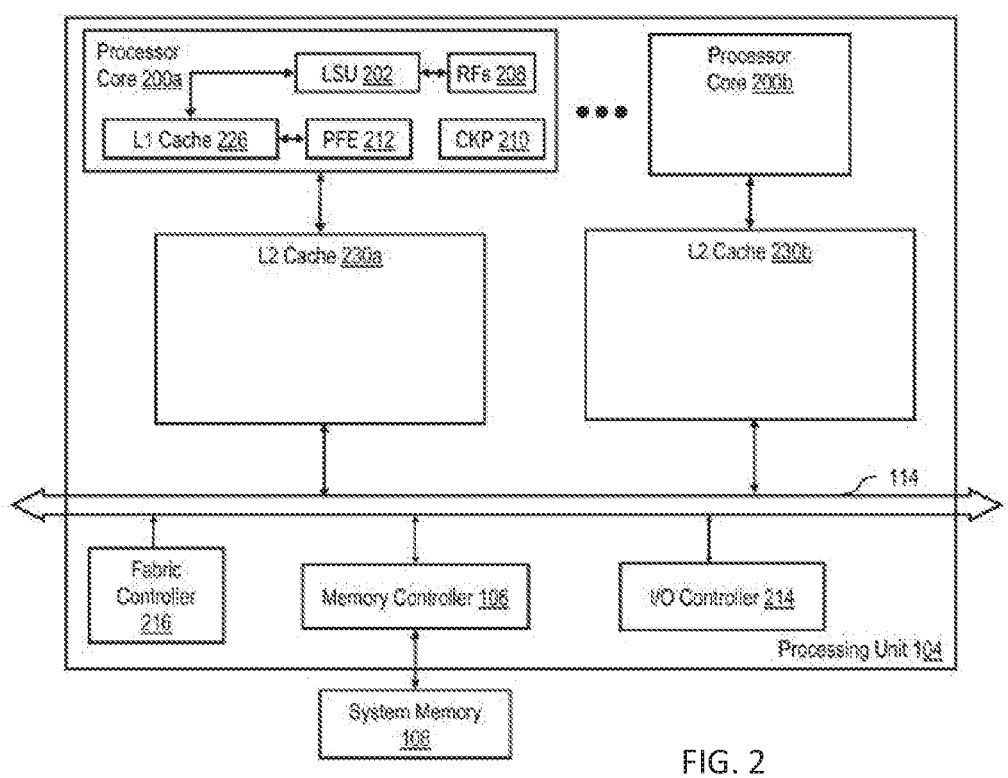
FIG. 2 depicts a more detailed block diagram flow diagram of a data processing system according to embodiments of the invention.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In a preferred embodiment, each processor core 200 is capable of independently executing multiple hardware threads of execution simultaneously. However, in the following description, unless the interaction between threads executing on a same processor core is relevant in a particular context, for simplicity, terms "processor core" and "thread executing on a processor core" are used interchangeably. As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 130 for each processor core 200a, 200b. In order to efficiently handle multiple concurrent memory access requests to cacheable addresses, each L2 cache 130 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 130 for servicing.

It will also be appreciated by those skilled in the art that access latency can be improved by prefetching data that is likely to accessed by a processor core 200 into one or more levels of the associated cache hierarchy in advance of need. Accordingly, processing unit 104 can include one or more prefetch engines, such as prefetch engine (PFE) 212, that generate prefetch load requests based on historical demand access patterns of processor cores 200.

With prefetching, instead of retrieving data from system memory exactly when it is needed, a prediction is made as to what data will be needed in the future. Based on the prediction, data is fetched from system memory 108 to L2 cache 230a or 230b (or sometimes directly to L1 cache 226). If L2 cache 230a is full when prefetch data is written to it, part of the L2 cache 230a is overwritten with the new prefetch data.

A cache is written to in increments that is sometimes referred to as a "cache line." The number of cache lines in a cache depends on both the size of the cache line (typically between 4 and 64 bytes) in addition to the size of the cache.

A problem can occur when cache is used in conjunction with transactional memory. As described above, in transactional memory, a portion of memory is copied to a temporary memory, operations are performed on the temporary memory, then the temporary memory is committed to main memory if certain conditions are met (such as the memory locations not being used by other processes).

In some instances, a portion of memory is copied into an area of L2 cache 230a for use as the scratch memory. Therefore, when prefetch data is retrieved from system memory 108 into L2 cache 230a, it is possible that data in L2 cache 230a that is being overwritten is the transactional memory data. Overwriting transactional memory will result in the failure of the transactional memory operation, requiring the operation to be executed again, slowing down the processing speed of processor 100.

Embodiments of the present invention address the above-described issues by using a novel method and system to handle interactions between a cache and transactional memory. An analysis is performed to determine the type of prefetch being requested. In the case of a speculative prefetch, if the speculative prefetch will result in a transactional memory portion being overwritten or evicted, then the prefetch is not completed. Otherwise, the prefetch will occur.

Figure 5:
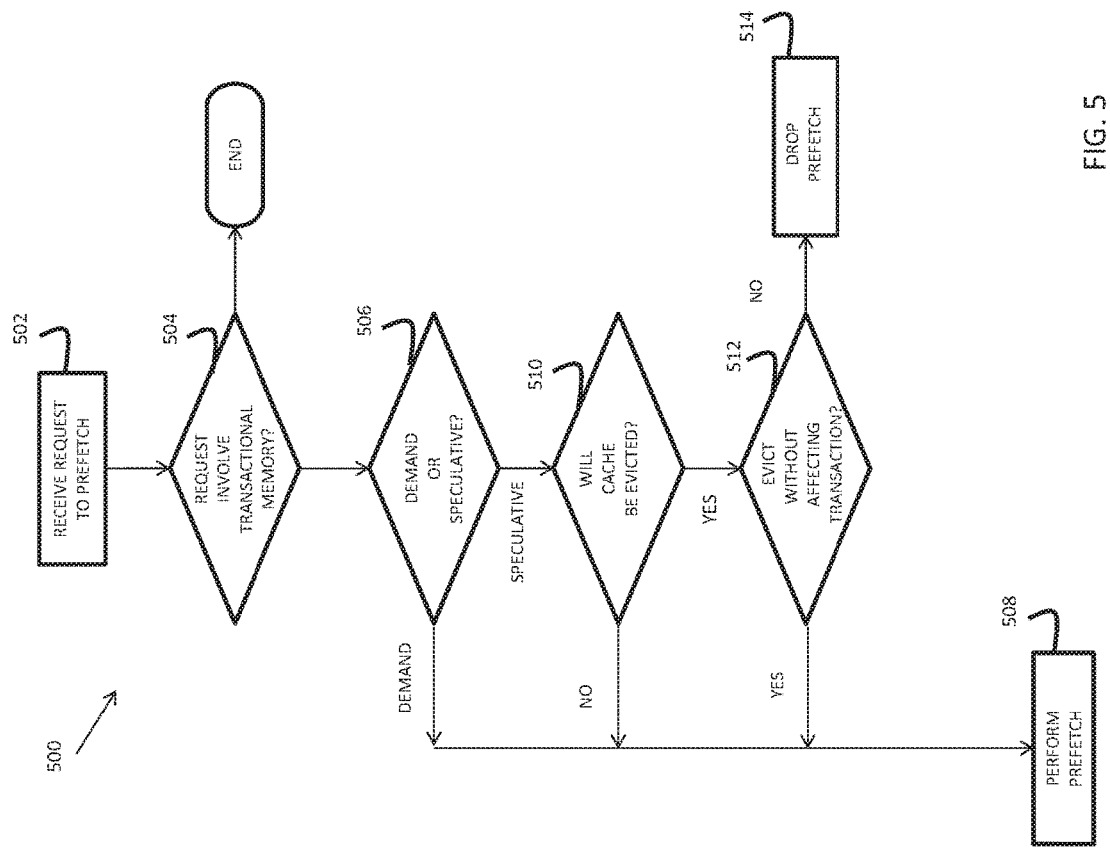
FIG. 5 depicts a flow diagram illustrating the operation of one or more embodiments.

A flowchart illustrating method 500 is presented in FIG. 5. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined or skipped. In one or more embodiments, method 500 is performed by a processor as it is executing instructions.

A request is received to prefetch data from main memory to cache (block 502). The prefetch request can be generated in one of a variety of different manners. In one or more embodiments, the processor automatically generates prefetch requests based on a variety of criteria, in an attempt to speed up the processor by guessing as to which data will be used by a processor.

The request is analyzed to determine if it involves any transactional memory (block 504). If not, then this process ends (block 512) and other methods can be used to handle the prefetch request. The request is analyzed to determine if it is a demand prefetch or a speculative prefetch (block 506).

In some embodiments, cache prefetches can broadly be categorized into two categories, demand prefetches (also known as a demand load or a demand request), and speculative prefetches (also known as a speculative execution fetch). A demand prefetch occurs when a cache needs specific data to be transferred from main memory to cache memory to execute an instruction, such as a "next to complete" instruction. A speculative prefetch occurs when the request for a transfer of data to be transferred from main memory to the cache is only predicted to be needed and has not been specifically requested. These can be, for example, the result of a conditional branch prediction. In a conditional branch prediction, a prediction is made as to which branch is to be taken. Thereafter, memory is retrieved based on the prediction. If the prediction is correct, then the next instruction has already been fetched. If the prediction is wrong, the next instruction has to be retrieved. However, until a conditional branch actually resolves, instructions after the conditional branch may be considered to be speculative.

The determination of whether a request is a demand prefetch or a speculative prefetch can be performed in a variety of different manners. In some embodiments, a hardware prefetcher (such as prefetch engine 212) is coupled to a load/store unit (such as LSU 202) within a processor or processor core (such as processor core 200a). At the time the prefetcher issues a prefetch request, it may know whether the request is a demand prefetch or a speculative prefetch. Thus, a prefetch request may be accompanied by a notification (such as a single bit) that indicates which type of prefetch is being requested. In some embodiments, an analysis is performed to determine if the prefetch is a demand prefetch or a speculative prefetch. Many methods can be used to perform such an analysis, both those now known and those developed in the future.

If the request is a demand prefetch, the prefetch occurs (block 508). No check is performed with respect to transactional memory. Even if the prefetch will result in a failure due to an eviction of the transactional memory from the cache, the prefetch still occurs. The result will be the failure of any transaction that use the transactional memory that is evicted. If the request is a speculative prefetch, then an additional analysis is performed.

It is determined if the prefetch will result in the eviction of a portion of transactional memory (block 510). This can be accomplished in a number of different manners. For example, the cache can be examined to determine if there will be any data that will be evicted. This can involve determining the size of the prefetch request and the size of the transactional memory. From that data, it can be determined how much information can be safely removed from the cache without affecting transactional memory (for example, determining if there is information in the cache that is no longer needed). Transactional memory logic within a processor can be used to perform such a determination. Transactional memory logic includes entries that indicate which cache lines are included in a transaction footprint.

If the prefetch can occur without evicting data that is needed for transactional memory, the operation can proceed with block 508, because the transactional memory is not affected by the prefetch request.

If the size of the prefetch request is greater than the amount that can be safely removed from the cache, that means some data will be evicted from the cache. It is determined if data can be evicted from the cache without affecting the transactional memory (block 512). In some instances, a portion of the cache can be chosen to be evicted ahead of the portion of cache that is reserved for transactional memory. Only if it is not possible to save the portion of cache reserved for transactional memory will the prefetch request be dropped (block 514). In all other situations, the prefetch can be performed (block 508).

Figure 6:
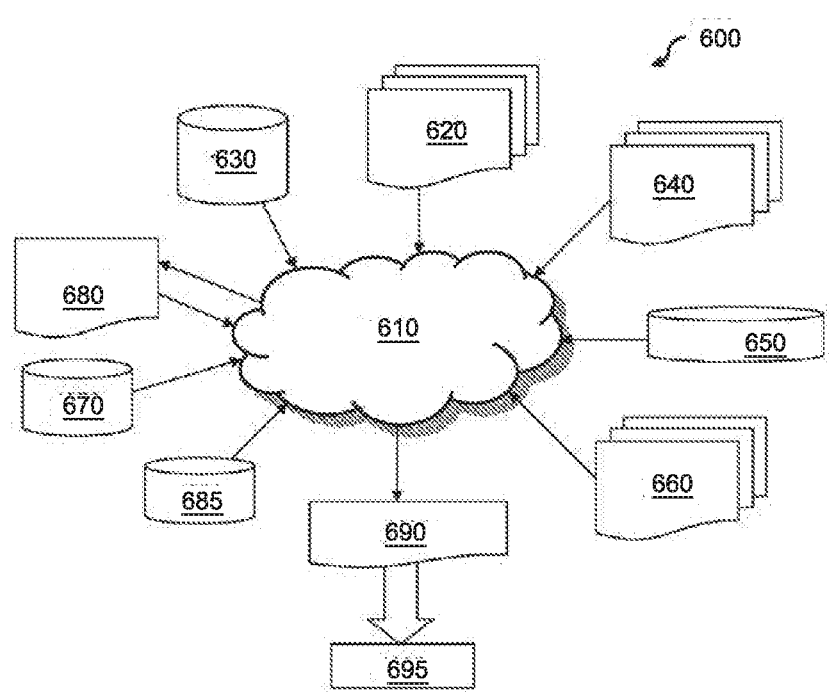
FIG. 6 depicts a data flow diagram illustrating a design process.

With reference now to FIG. 6, there is depicted a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA).

FIG. 6 illustrates multiple such design structures including an input design structure that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those described above. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown above to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown above. In one embodiment, design structure 690 may comprise a compiled, executable HDL simulation model that functionally simulates the devices shown above.

Design structure 690 may also employ a data format used for the exchange of layout data of integrated circuits and/or symbolic data format (e.g., information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown above. Design structure 690 may then proceed to a stage 695 where, for example, design structure 690: proceeds to tape-out, is released to manufacturing, is released to a mask house, is sent to another design house, is sent back to the customer, etc.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiments were chosen and described in order to best explain the principles of operation and the practical application, and to enable others of ordinary skill in the art to understand embodiments of the present invention for various embodiments with various modifications as are suited to the particular use contemplated.

What is claimed is:

1. A computer system for handling cache prefetch requests, the system comprising:

a cache memory; and a processor system communicatively coupled to the cache memory;

the processor system configured to:

receive a request to prefetch data from a main memory to a cache; and based on a determination that the prefetch request is a speculative prefetch request, determine if the cache is being used for transactional memory;

based on a determination that the cache is not being used for transactional memory, process the prefetch request;

based on a determination that the cache is being used for transactional memory and based on a determination that the prefetch request can be processed without affecting transactional memory, process the prefetch request, wherein the determination that the prefetch request can be processed without affecting transactional memory comprises:

determining a size of the prefetch request, determining that the size of the prefetch request is smaller than a size of available cache memory, based on a determination that the size of available cache memory is smaller than the size of the prefetch request, determining a size of information that can be removed from cache memory without affecting transactional memory, and if the size of the prefetch request is less than a size of information that can be removed from cache memory without affecting transactional memory, then the prefetch request can be processed without affecting transactional memory; and based on a determination that the cache is being used for transactional memory and based on a determination that the prefetch request cannot be processed without affecting transactional memory, rejecting the prefetch request.

2. The computer system of claim 1 wherein the processor system is further configured to:

based on a determination that the prefetch request is not a speculative prefetch request, processing the prefetch request.

3. The computer system of claim 1 wherein determining the size of information that can be removed from cache memory without transactional memory is based at least in part on determining a size of the transactional memory.

4. The computer system of claim 1 wherein processing the prefetch request comprises:

determining an area of cache to remove;

moving information in the prefetch request from main memory to the area of cache to remove.

5. The computer system of claim 1 wherein the determination that the prefetch request will result in an eviction is based at least in part on determining the size of the prefetch request.

6. A design structure tangibly embodied in a non-transitory machine-readable storage medium for designing, manufacturing, or testing an integrated circuit, the design structure comprising:

a cache memory; and a processor core coupled to the cache memory, the processor core configured to:

receive a request to prefetch data from a main memory to a cache; and based on a determination that the prefetch request is a speculative prefetch request, determine if the cache is being used for transactional memory;

based on a determination that the cache is not being used for transactional memory, process the prefetch request;

based on a determination that the cache is being used for transactional memory and based on a determination that the prefetch request can be processed without affecting transactional memory, process the prefetch request, wherein the determination that the prefetch request can be processed without affecting transactional memory comprises:

determining a size of the prefetch request, determining that the size of the prefetch request is smaller than a size of available cache memory, based on a determination that the size of available cache memory is smaller than the size of the prefetch request, determining a size of information that can be removed from cache memory without affecting transactional memory, and if the size of the prefetch request is less than a size of information that can be removed from cache memory without affecting transactional memory, then the prefetch request can be processed without affecting transactional memory; and based on a determination that the cache is being used for transactional memory and based on a determination that the prefetch request cannot be processed without affecting transactional memory, rejecting the prefetch request.

7. The design structure of claim 6 wherein the processor core is further configured to:

based on a determination that the prefetch request is not a speculative prefetch request, processing the prefetch request.

8. The design structure of claim 6 wherein determining the size of information that can be removed from cache memory without transactional memory is based at least in part on determining a size of the transactional memory.

9. The design structure of claim 6 wherein processing the prefetch request comprises:

determining an area of cache to remove;

moving information in the prefetch request from main memory to the area of cache to remove.

* * * * *